(12) United States Patent
Coven

(10) Patent No.: US 6,767,586 B1
(45) Date of Patent: Jul. 27, 2004

(54) METHOD OF APPLICATION OF ANTI-SLIP MATERIAL FOR SURFACES

(76) Inventor: Steven R. Coven, 1328 Linden Ave., Highland Park, IL (US) 60035

( * ) Notice: Subject to any disclaimer, the term of this patent is extended or adjusted under 35 U.S.C. 154(b) by 0 days.

(21) Appl. No.: 10/268,245

(22) Filed: Oct. 10, 2002

Related U.S. Application Data
(60) Provisional application No. 60/329,805, filed on Oct. 16, 2001.

(51) Int. Cl.$^7$ .............................. B05D 3/02; B05D 1/02; B05D 1/28
(52) U.S. Cl. ................. 427/376.1; 427/372.2; 427/421; 427/429
(58) Field of Search .......................... 427/376.1, 372.2, 427/421, 429

(56) References Cited

U.S. PATENT DOCUMENTS

| | | |
|---|---|---|
| 3,406,418 A * | 10/1968 | Hurley, Jr. et al. ...... 15/104.93 |
| 3,879,388 A | 4/1975 | Varsanyi et al. |
| 5,356,466 A | 10/1994 | Lawson |
| 5,423,910 A | 6/1995 | Schiller |
| 5,672,199 A | 9/1997 | Gossen et al. |
| 5,698,021 A * | 12/1997 | Dorsett ...................... 106/36 |
| 5,885,339 A | 3/1999 | Dorsett |
| 5,902,411 A * | 5/1999 | Williams et al. ............ 134/3 |
| 6,164,441 A * | 12/2000 | Guy et al. ................. 206/210 |
| 6,319,546 B1 | 11/2001 | Coven |

FOREIGN PATENT DOCUMENTS

WO    WO 96/10624 A  *  4/1996

* cited by examiner

Primary Examiner—Michael Barr
(74) Attorney, Agent, or Firm—Welsh & Katz, Ltd.

(57) ABSTRACT

A one-step method of treating a surface to increase its coefficient of friction without pretreating the surface or rinsing or removing a treating solution, utilizes an aqueous solution of ammonium bifluoride, and allows the solution to remain on the surface until the surface has dried. Preferred methods of application are applying the solution with a mop, by wiping the surface with a rag treated with the solution and by applying a mist of the solution onto the surface.

19 Claims, 1 Drawing Sheet

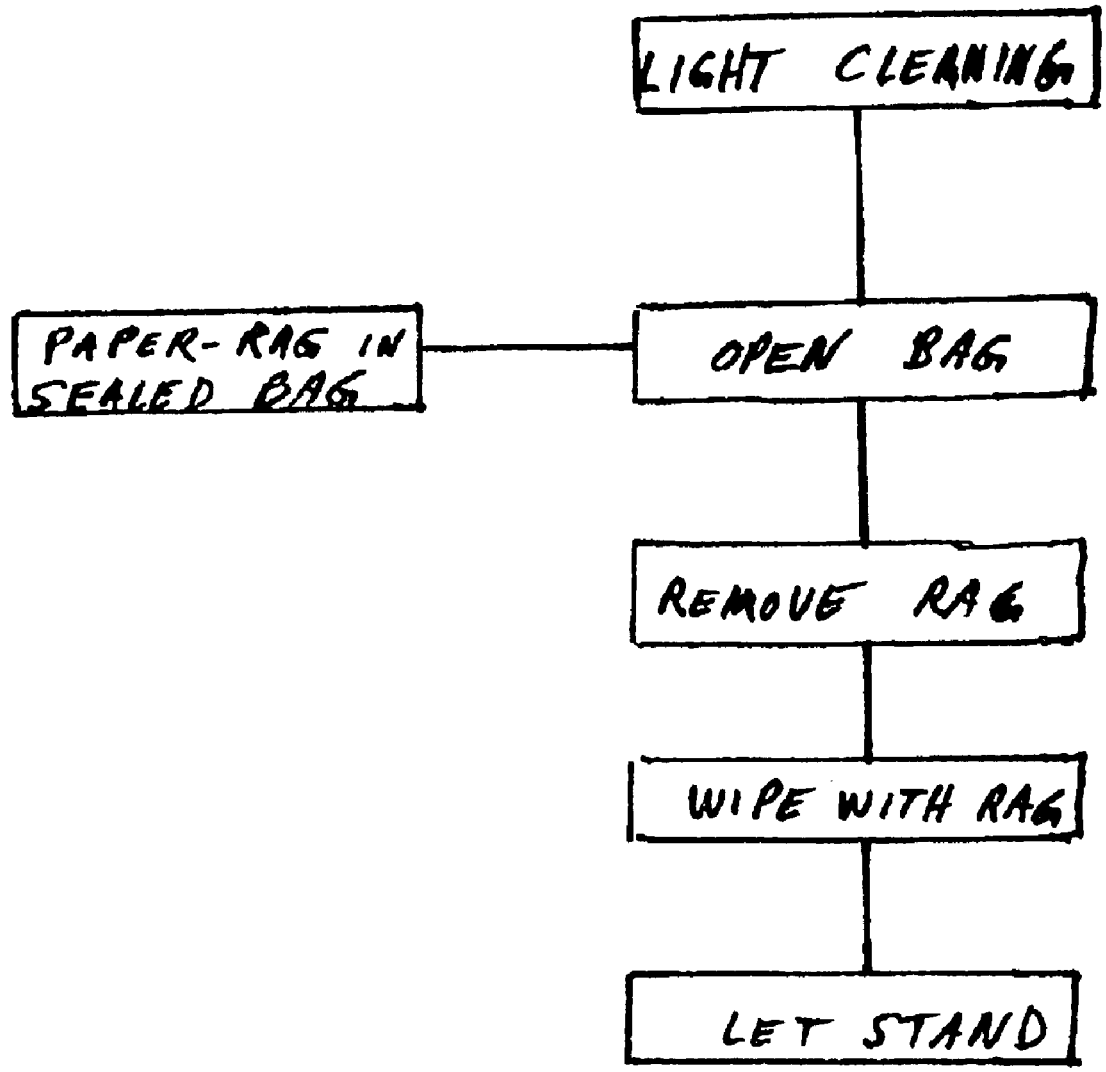

METHOD OF APPLICATION OF ANTI-SLIP MATERIAL FOR SURFACES

This application claims the benefit of U.S. Provisional Application No. 60/329,805, filed Oct. 16, 2001.

FIELD OF THE INVENTION

This invention relates to the maintenance of surfaces, such as floors, and particularly porous, glazed or ceramic surfaces such as bath tubs and shower stalls, especially when these materials or products become wet. This invention relates to the use of formulations in a one step application to such surfaces, to maintain an effective coefficient of friction, thereby reducing the probability of slipping and falling.

BACKGROUND OF THE INVENTION

A significant cause of injury to employees in the workplace, customers in commercial establishments and individuals in their own homes is falls resulting from slippery underfoot surfaces. Ceramic surfaces, such as ceramic tiles, granite, marble, porcelain, enamel and other similar surfaces can often have slippery surfaces and these surfaces generally become more slippery when wet. The generally recognized criterion for slip resistant floor surfaces is a coefficient of friction of 0.6 obtained in the ASTM C-1028 or D-2047 standardized tests. In order to increase the coefficient of friction on ceramic or porcelain surfaces, e.g., make them less slippery, sand or other abrasive materials may be added to the surfaces or included in preparation of ceramic tile during formation. Porcelain, such as bath tub surfaces, often have adhesive strips of abrasive materials applied to their surfaces.

The cause for a low coefficient of friction on presumably nonslip surfaces is the build up of grease, oils, dirt and soap or detergent residues from cleaning compounds which tend to fill the pores and coat a raised abrasive surface. There are several products on the market designed to remove these surface deposits. In some instances, these treatments further roughen the surface. However, these materials generally require a daily application over an extended period of time to bring about these changes.

A number of other methods have been attempted to overcome the problem of slipperiness encountered with wet surfaces. Generally, the problem is addressed with solutions containing inorganic or organic acids, which need to be applied in a multi-step process, and require reapplication to maintain the desired coefficient of friction. U.S. Pat. No. 5,902,411 to Williams et al. addresses such a material. Williams et al. discloses a cleaning and restoring composition, and repeated applications in order to maintain the floor's optimum coefficient of friction. The Williams et al. formulation consists of two components, a surfactant and a treating agent. The treating agent can be either a fluoride-containing compound or an organic acid at specific concentrations. The formulation must be applied with either a mop or a mop with an abrasion pad, and the formulation must be removed by rinsing. One major deficiency of the Williams et al. formulation and application is that the formulation cannot be easily applied to the surface. The Williams' et al. anti-slip formulation, as disclosed in the patent, is applied by a mopping process, which provides a difficult application process. Additionally, another disadvantage in the Williams et al. formulation and application is the need for repeated reapplication in order to maintain the anti-slippery properties on the surface. As disclosed in the Williams et al. patent, after the formulation is applied, it is essential to reapply the formulation at least once every five to ninety days and as frequently as every day, depending on the amount of pedestrian traffic to which the treated area is submitted.

Yet another problem encountered by the prior art is that many of the anti-slip formulations and methods require additional steps such as pre-treating or rinsing the surface after the formulation is applied. This problem is further compounded because most solutions used for anti-slip applications are highly acidic and thus are difficult to apply since protective measures, such as gloves and eyewear, must be utilized during the application and follow-up processes.

Thus, there is a need for a one-step method of application by which a composition can be applied to ceramic, glazed tile, granite, marble, enamel and porcelain surfaces, which can bring about an immediate as well as a long-term increase in the coefficient of friction of these surfaces. Additionally, there is a need for the treatment of these surfaces to be performed easily and safely. Furthermore, there is a need for a method that need only be applied once to a surface to maintain the desired coefficient of friction. Still further, there is a need for a user-friendly, convenient package of material for surface treatment, which can be easily utilized and disposed of after application of the material to a surface to be treated.

SUMMARY

One aspect of the present invention is the provision of a one-step application method for application of an aqueous anti-slip composition utilizing uncomplicated means, for example, applying the composition with a mop, misting or wiping the surface with the anti-slip composition, and allowing the solution to remain on the surface until the surface is dry. The surface can be granite, marble, porcelain, enamel or ceramic, such as ceramic tiles or sanitary ware, such as tubs, shower floors or pans, basins, vanity tops, and other similar surfaces. Another aspect of the present invention is a method of application of an anti-slip composition which utilizes a paper rag impregnated with an anti-slip composition, which rag can be used in one step application by wiping on the surface to improve the anti-slip characteristic of a surface, and which can be disposed of after the application. Still another aspect of the present invention is the application of the anti-slip composition in the form of a mist, i.e., a suspension of aqueous anti-slip composition in air. Yet another aspect of the present invention is the provision of a method of application in which the anti-slip composition is easily applied to a surface and maintains the desired coefficient of friction without the need for pre-treating, rinsing or reapplication.

BRIEF DESCRIPTION OF THE DRAWINGS

The figure in the drawing is a flow diagram illustrating the principal elements in the one-step method of one embodiment of the present invention.

DETAILED DESCRIPTION OF A PREFERRED EMBODIMENT

The present invention provides a one-step application method of treating and maintaining an effective anti-slip surface. In the method of the present invention it is not necessary to pre-treat the surface prior to applying the anti-slip formulation, except for a light cleaning to remove loose particles and dirt. The anti-slip surface is achieved by increasing the coefficient of friction of the surface. The anti-slip solution utilized in the one-step method of the present invention comprises an inorganic compound, preferably an aqueous solution of about 2 percent to 10 percent by weight ammonium bifluoride, more preferably an aqueous solution of from about 2 percent to about 5 percent by weight ammonium bifluoride, and most preferably an aqueous solution of approximately 3 percent by weight ammonium bifluoride.

In its simplest form in accordance with the one-step method of application of the present invention, the anti-slip composition is applied to a surface to be treated, which has been lightly cleaned by removing any loose particles and dirt, with a mop, preferably a sponge mop. The composition so applied is allowed to remain on the surface until the surface is dry. This form of the method of the present invention is particularly useful in treating large surface areas, such as granite or marble or tile halls or entrance ways, and the like. Preferably, the anti-slip composition, and particularly an aqueous solution having the concentration noted above, is applied at a rate of about one gallon of composition to 1200–1500 square feet of surface. The surface, with adequate ventilation, such as by having a fan pass air thereover, is found to be dry in a relatively short time, such as within approximately one half hour or less depending on the amount of ventilation.

In another preferred embodiment, an anti-slip composition on a rag is applied in a one step process by wiping the composition on the rag onto the surface to be treated, resulting in an effective anti-slip surface. The solution is preferably applied by providing a lint-free paper rag saturated with the solution and wiping the impregnated rag onto the surface to be treated. Approximately two ounces of about two percent to about ten percent aqueous ammonium bifluoride solution is effective to treat six to twelve square feet of surface. The anti-slip composition impregnated on the lint-free paper rag can be provided in a ready to use form, for example, sealed in a impermeable package such as an air and liquid impermeable plastic or foil bag. Following thorough wiping with the rag, the spreading of solution can be seen by noting the wetness or sheen on the surface.

In still another preferred embodiment of the present invention, the anti-slip composition is applied to the surface to be treated in the form of a mist applied to the surface. The preferred anti-slip composition is an aqueous solution of ammonium bifluoride in the concentrations noted above. The mist can be formed by placing the composition in a misting device, such as are commercially available and are known in the pesticide industry, such as for misting to exterminate mosquitos, and other low flying insects. The use of a mist is particularly useful in treating areas such as halls, entrance ways and other heavily used pedestrian traffic areas. It is preferable that the mist of the aqueous solution of ammonium bifluoride at the concentrations noted above is applied at a rate of about one gallon of solution to 1200–1500 square feet of surface. The surface with adequate ventilation, such as by having a fan pass air thereover, is found to be dry in a relatively short time, such as within approximately one half hour or less.

In the preferred embodiments noted above, the composition can be applied to the surface until an increase in friction is detected by, for example, pushing a foot across the surface. At this time, the formulations have had the desired effect on the desired surface. Once the desired effect has been achieved, there is no need for the formulation to be rinsed or removed from the surface. The surface is ready to be used in a short time, often as soon as it is dry. In essence, the anti-slip surface achieved by friction is accomplished by a one step process application.

EXAMPLE

In one preferred embodiment of the method of the present invention, generally illustrated in the figure of the drawing, which is referenced herein, the surface to be treated, in this case a ceramic bathtub bottom, is first lightly cleaned by removing any loose particles, such as dirt particles, as noted in the first block of the figure of the drawing.

A lint-free paper rag saturated with a 3% aqueous solution of ammonium bifluoride had earlier been placed in a vapor and liquid impermeable bag and sealed, and is provided as illustrated by the block at the left in the figure of the drawing. Conveniently, the rag may measure approximately eight inches by eight inches, although rags having larger or smaller surface areas can be used. The bag is now opened and the rag removed as in the second and third blocks under the first block in the figure of the drawing.

The bottom surface of the tub is wiped with the rag to coat the surface to be treated with the aqueous solution, as illustrated in the fourth vertically aligned block in the figure of the drawing. The applied coating can be seen by the reflection of the moisture on the surface as the solution is applied. In this manner it can be observed that all desired areas of the surface have been wiped with the rag.

The last step in the method is to let the solution stand on the surface until it is dry, as illustrated in the last block of the drawing. In this example, the solution is dry after about 30 minutes with adequate ventilation of the bathtub, i.e., a fan exhausting the air as is customary in residential bathrooms.

Upon completion of the method of application, the bathtub, or other surface, can be used in the normal manner, with the surface having improved resistance to a user slipping on the surface.

The invention has been described in considerable detail with reference to certain embodiments, and particularly with respect to the currently preferred embodiments thereof. However, it will be understood that variations, modifications and improvements may be made, particularly by those skilled in this art and in light of the teachings referred to herein within the spirit and scope of the invention as claimed.

I claim:

1. A one-step method of treating a surface to increase the coefficient of friction thereof without pre-treating the surface or rinsing or removing a treating solution from the surface, comprising applying an aqueous solution consisting essentially of ammonium bifluoride in an amount sufficient to increase the coefficient of friction of the surface which has been lightly cleaned by removing any loose materials thereon, and allowing the solution to remain on the surface until the surface is dry.

2. The one-step method of claim 1, wherein the aqueous solution consisting essentially of ammonium bifluoride at a concentration of from about 2 percent to about 10 percent ammonium bifluoride by weight is applied to the surface to be treated with a mop.

3. The one-step method of claim 2, wherein the aqueous solution consisting essentially of ammonium bifluoride is applied to the surface to be treated with a sponge map.

4. The one-step method of claim 3, wherein the aqueous solution consisting essentially of ammonium bifluoride is applied to the surface to be treated at a rate of about one gallon of solution to 1200–1500 square feet of surface.

5. The one-step method of claim 1, wherein the aqueous solution consisting essentially of ammonium bifluoride is applied to the surface to be treated by wiping the surface with a rag treated by infusing thereto an aqueous solution consisting essentially of ammonium bifluoride at a concentration of from about 2 percent by weight to about 10 percent by weight ammonium bifluoride.

6. The one-step method of claim 5, wherein the rag is a lint-free paper rag.

7. The one-step method of claim 6, wherein the pre-treated lint-free rag is sealed in a package which is impermeable to air and liquid.

8. The one-step method of claim 7, wherein the lint-free paper rag has been pre-treated by infusing with an aqueous solution consisting essentially of approximately 3 percent by weight ammonium bifluoride, and sealed within a plastic bag which is impermeable to air and liquid.

9. A one-step method of treating a surface to increase the coefficient of friction thereof without pre-treating the surface or rinsing or removing a treating solution from the surface, comprising wiping the surface to be treated with a rag treated by infusing thereto an aqueous solution consisting essentially of ammonium bifluoride in an amount sufficient to increase the coefficient of friction of the surface which has been lightly cleaned by removing any loose materials thereon to coat the surface and allowing the solution to remain on the surface until the surface is dry.

10. The method of claim 9 wherein the aqueous solution is an aqueous solution consisting essentially of approximately 2 percent to approximately 10 percent by weight ammonium biflouride.

11. The method of claim 10 wherein the aqueous solution consisting essentially of ammonium bifluoride is applied to the surface to be treated in an amount of approximately two ounces of solution per 6–12 square feet of surface.

12. The method of claim 11, wherein the solution is applied by wiping the surface to be treated with a lint-free paper rag treated by infusing thereto the solution and which is sealed in a package which is impermeable to air and liquid.

13. The method of claim 9 wherein the aqueous solution consisting essentially of ammonium bifluoride is an aqueous solution consisting essentially of approximately 3 percent to approximately 5 percent by weight of ammonium bifluoride.

14. The method of claim 13 wherein the aqueous solution is applied to the surface to be treated in an amount of approximately two ounces of solution per 6–12 square feet of surface.

15. A one-step method of treating a surface to increase the coefficient of friction thereof without pre-treating the surface or rinsing or removing a treating solution from the surface, comprising applying a mist of an aqueous solution consisting essentially of ammonium bifluoride in an amount sufficient to increase the coefficient of friction of the surface which has been lightly cleaned by removing any loose materials thereon, to coat the surface, and allow the solution to remain on the surface until the surface has dried.

16. The method of claim 15, wherein the aqueous solution is an aqueous solution consisting essentially of approximately 2 percent to approximately 10 percent by weight ammonium bifluoride.

17. The method of claim 16, wherein the aqueous solution is applied to the surface to be treated in an amount of approximately one gallon of solution per 1200 to 1500 square feet.

18. The method of claim 17, wherein the aqueous solution is an aqueous solution consisting essentially of approximately 3 percent to approximately 5 percent by weight ammonium bifluoride.

19. The method of claim 18, wherein the aqueous solution is applied to the surface to be treated in an amount of approximately one gallon of solution per 1200 to 1500 square feet.

\* \* \* \* \*